(12) United States Patent
Decher et al.

(10) Patent No.: US 8,434,807 B2
(45) Date of Patent: May 7, 2013

(54) PLASTIC SKIN HAVING CONDUCTORS

(75) Inventors: Heribert Decher, Barsinghausen (DE); Harald Dalibor, Garbsen (DE); Stefan Sostmann, Langenhagen (DE); Christian Seidel, Hannover (DE); Dieter Borvitz, Hannover (DE); Wolfram Herrmann, Wunstorf (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 126 days.

(21) Appl. No.: 13/064,074

(22) Filed: Mar. 4, 2011

(65) Prior Publication Data

US 2011/0227360 A1    Sep. 22, 2011

Related U.S. Application Data

(63) Continuation of application No. PCT/EP2009/059835, filed on Jul. 30, 2009.

(30) Foreign Application Priority Data

Sep. 4, 2008 (DE) .......................... 10 2008 045 757

(51) Int. Cl.
*B60R 13/01* (2006.01)

(52) U.S. Cl.
USPC .............................. 296/39.1; 156/51; 264/104

(58) Field of Classification Search ............. 297/180.12, 297/180.1; 264/45.7, 310, 104; 296/39.1; 156/51

See application file for complete search history.

(56) References Cited

U.S. PATENT DOCUMENTS

| | | | |
|---|---|---|---|
| 5,662,996 A * | 9/1997 | Jourquin et al. ........... 428/318.8 |
| 6,730,247 B2 * | 5/2004 | De Winter et al. .......... 264/45.5 |
| 7,192,543 B2 | 3/2007 | Malfliet et al. |
| 2005/0225128 A1 | 10/2005 | Diemer et al. |
| 2008/0290683 A1 | 11/2008 | Ohlinger et al. |
| 2010/0090360 A1 | 4/2010 | Walter et al. |

* cited by examiner

*Primary Examiner* — Lori Lyjak
(74) *Attorney, Agent, or Firm* — Ottesen P.A.

(57) ABSTRACT

The invention relates to a single or multiple-layer plastic skin as the surface covering of coated objects. Regions are disposed in the plastic skin which are made up of a mixture of the plastic material of the plastic skin and a conducting material.

15 Claims, 1 Drawing Sheet

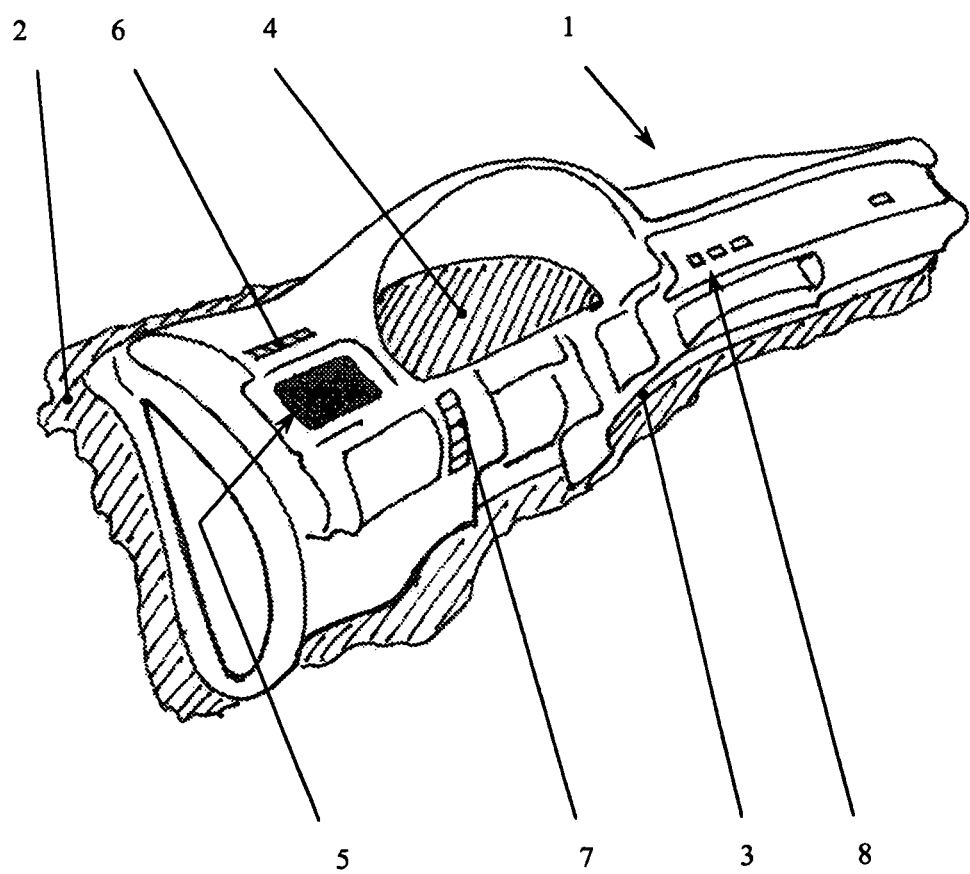

PLASTIC SKIN HAVING CONDUCTORS

CROSS REFERENCE TO RELATED APPLICATIONS

This application is a continuation application of international patent application PCT/EP 2009/059835, filed Jul. 30, 2009, designating the United States and claiming priority from German application 10 2008 045 757.4, filed Sep. 4, 2008, and the entire content of both applications is incorporated herein by reference.

FIELD OF THE INVENTION

The invention relates to a plastic skin as a surface covering of coated objects. The plastic skin is provided with an embedded electrically conducting path. Likewise disclosed are particularly suited methods of manufacturing such a plastic skin as well as a trim component covered with such a plastic skin, as well as a seat cover for the interior of a vehicle.

BACKGROUND OF THE INVENTION

Grained, patterned or finely structured plastic skins are known as surfaces for objects and are, for example, used for interior trims in vehicles, here often as relatively soft underfoamed foils with pleasant haptics, for instance, for the covering of dashboards or the inner shells of doors, et cetera. When correspondingly adapted in strength and design, such foils are quite naturally also used for other high-quality coated goods.

In the state of the art, different processes are known for the production of such plastic skins, for example, rolling or embossing methods for the production of "endless" foil tracks made of thermoplastic plastic or methods for the production of machine-produced individual molded skins, that is, of plastic molded components.

In the rolling and embossing methods, a thermoplastic foil provided as a sheeting is provided with a three-dimensionally structured, embossed surface, that is, approximately a grained "leather" surface, with the aid of an embossing roller.

Machine-produced molded skins here denote more or less rigid molded plastic components which, for example, are produced by a variety of sintering or spraying methods in mold tools in which one or more liquid or powder components are deposited in a form and react/harden there. Machine-produced molded skins are thus also created by rotation sintering, for example, by methods for producing so-called slush-skins.

In these machine-produced methods it is also possible to determine the surface structure/texture, that is the surface of the plastic skin, that is, the approximate appearance of a grain, and the geometry of the entire component in a single forming process during manufacture. For this, the grain structure and component geometry are introduced into a molding form as a negative, the plastic skin is formed by a sintering or spraying process and removed thereafter.

The sheeting as well as the molded skins are generally provided with a layer of plastic foam on their back side, either after embossing or after insertion/deep-drawing into the component mold (sheeting) or already in the molding in which the plastic skin is manufactured (molded skins). Of course, other processes such as carding processes are known for foam-coating. Because of the subsequent back-foaming, an already reasonably rigid three dimensionally formed component results. The back-foaming here only represents one possibility of forming a support structure for the plastic skin. Likewise, adhesive bonding of structure-support elements of hard plastic is known.

U.S. Pat. No. 7,192,543 discloses a method for manufacturing machine-formed melt bodies/cast bodies, such as dashboards, door panels, or glove compartments, in which a divided bottom mold is initially and at least partially provided with an elastic foil, which covers the seams in the form, and which has a texture on its inner side, for example, a leather texture. A reactive mixture, which then forms the outer skin of the component, is sprayed onto the elastic foil before further reinforcements or foam layers are applied by means of different spraying or melting methods.

Usually, the molded skins with the support structure are cleanly worked on after the manufacturing process, that is any possible skin edges are cut off, and in dashboards, for example, the necessary cavities and holes for instruments, switches, trim strips, radios, et cetera are produced. Thereafter, for example, all switches and signal elements are individually installed into the dashboard and wired, that is, they are provided with connecting lines which are then connected during installation into the vehicle. The same is true for the installation of instruments, illuminants, speakers, et cetera. Trim strips and holders must also still be affixed.

Overall, substantial effort, a number of time and cost intensive manufacturing steps, and a logistical plan are still required prior to the transfer of an installation-ready dashboard, door insets, or similar components with functional elements to the subsequent processing operation, here the vehicle manufacturer.

To reduce the manufacturing effort, it has already been suggested to connect electrical conductors or thin membrane circuits, that is, foils provided with thin, deposited or adhesively bonded metallic conductors, directly to the back side of the molded skins or foils before or after the back-foaming, that is essentially to cover or laminate.

Thereby, the problem results that during the joining of the two different materials (molded skins or foils and conductors), the decor surface, that is the surface of the plastic skin which can be seen from outside, is damaged by the contact pressure during the laminating/covering process.

Further, there exists the problem that the materials leave markings on the decor surface when they are laminated with temperatures that are too high, and when individual materials having different shrinkage are laminated/covered and cool down at different rates.

Further, the problem persists that when stored in a warm environment, the molded skins or foils have different thermal expansion coefficients and, as a result thereof, a second track, which is possibly laminated behind the decor surface, becomes visible.

Further, there exists the problem that the decor surface experiences buckling after manufacturing and laminating with a conductor because of the different rigidity of the materials.

Furthermore, there is the problem that certain regions of the surface, especially in surfaces which are produced by the slush-process (rotation sintering), become creased during demolding because of the different degrees of rigidity.

Further, there exists the problem that the hard to access regions of a molded skin cannot be laminated/covered with a membrane circuit or a conductor, since accessibility of the back side is not given.

SUMMARY OF THE INVENTION

It is an object of the invention to provide a plastic skin which, on the one hand, reduces the elaborate steps of further processing and, on the other, combines a high-component integration with a pleasant appearance of the plastic skin.

As a surface cover, the plastic skin of the invention is for a part for the interior of a vehicle. The plastic skin includes: an electric conducting path embedded in the plastic skin; the plastic skin being composed of a plastic material; and, the electric conducting path being a mixture of the plastic material of the plastic skin and a conducting material.

A solution in view of an appropriate manufacturing process for such a plastic skin is also disclosed herein.

The conducting path comprises a mixture of plastic materials, that is of the base material of the plastic skin, and a conducting material. The conducting paths comprise, on the one hand, a mixture of polymers as a matrix which has characteristics regarding the thermal expansion and structure that are comparable to those of the plastic skin, and, on the other, of a conducting material. Thus, after curing, conducting materials/material parts are integrated into the resulting plastic matrix. Advantageously, special conductive sponge rubber, carbon black, carbon fiber, C-Nanotubes, intrinsically conductive polymers or a metal powder or mxitures thereof can be used as conducting materials. Thus, depending on the application, the necessary ohmic resistance, that is, the conductivity, can be adjusted in wide limits simply by changing the mixture. Of course, other conducting materials are also suitable, for example, metal-coated cores, et cetera.

The mixture of the polymer matrix materials with the conducting material can be applied to the back side of the decor surface via a spray robot. If the decor surface is sufficiently hot, the sprayed-on mixture can melt thereon and enter to a solid bond with the decor surface.

In an advantageous embodiment, the plastic material of the plastic skin comprises polyvinylchloride (PVC) and the conducting path comprises a mixture of polyvinylchloride and graphite or carbon black. Thereby, in view of spraying processes, an especially good processability of the materials and a good relationship between the mechanical strength properties and conductivity result.

A further advantageous embodiment results when the conducting path is arranged on the back side of the plastic skin. This makes the manufacture easier even in complicated forms of the plastic skin.

A further advantageous embodiment results when the conducting path is arranged as an intermediate layer inside the layer thickness of the plastic skin. Thus, the conducting path is not completely surrounded by non-conducting plastic whereby any later short circuits are possibly avoided.

A particularly suitable method for manufacturing a conducting path or a conducting path mixture of polymer matrix materials as plastic material and a conducting material is achieved in that the conducting material is incorporated in the plastic material in a rolling-kneading process. This is best achieved with relatively high shear forces, that is, with a relatively small roll gap between the knead rollers and at a relatively high temperature.

A particularly suitable method of manufacture of a plastic skin according to the invention results when the plastic skin is structured as a molded skin by a successive multiple melting-on of plastic materials on surface regions of a heated-up mold and thereafter the mold skin is removed from the mold. The multiple melting-on is accomplished in that initially at least one layer of the plastic material of the plastic skin is applied to the mold and is melted on therewith, and that thereafter, a mixture of the plastic material of the plastic skin and a conducting material is applied and is melted on. Such a method can be easily integrated into existing production plants.

In a further advantageous embodiment, the successive melting-on is accomplished in that initially at least one layer of the plastic material of the plastic skin is applied to the mold in the form of a powder and is melted on, and that subsequently the mixture of the plastic material of the plastic skin and a conducting material is applied in the form of a powder mixture and is melted on. The processing of powdery plastic components in a heated reaction mold can be easily integrated in a sinter or slush process, preferably a rotation sintering process.

Pulverized conducting material can, for example, be produced in that the above-mentioned conducting mixture produced by a rolling-kneading process can be pulverized again after production.

In a further advantageous embodiment, multiple layers of pulverized plastic material and pulverized mixture are alternatingly applied and melted on. Thus, spatially distributed conducting paths can be created and thereby complex feed lines and switches can be realized.

In a further advantageous embodiment, prior to applying the pulverized mixture, the portions of the surface of the previously applied plastic materials of the plastic skin, which are not intended to have conducting paths, are covered by a cover or mask. Thus, exact shapes of the conducting paths can be produced.

In a further advantageous embodiment, the pulverized plastic material of the plastic skin is applied to the mold with the assistance of a rotation sintering process, or the pulverized mixture is applied to the surface of the already applied plastic material of the plastic skin with the assistance of a rotation sintering process. The slow melting process of the fine powdery granulates during the rotation sintering process at a heightened temperature results in an especially secure inclusion in the plastic skin or a secure melting on of the conducting paths on the plastic skin. Usually, in this type of process, a plastic powder is located in the heated and rotating mold/reaction. form and then melts onto the heated wall parts of the mold.

In a further advantageous embodiment, the pulverized mixture is applied to the surface of the already applied plastic material of the plastic skin via a spray process. Thus, one achieves exact positioning and dosing of the mixture.

In a further advantageous embodiment, the repeated melting on comprises initially applying at least one layer of the plastic material of the plastic skin to the mold in the form of a powder which is then melted on and, thereafter, applying and melting on the mixture of the plastic material of the plastic skin and a conducting material in the form of a mixture in the form of a solution. Solvents can substantially facilitate the bonding of the layers and thus speed up the production process.

In a further advantageous embodiment, the plastic skin is initially produced as a rolled sheet and, thereafter, a mixture of the plastic material of the plastic skin and a conducting material are applied and connected to the plastic skin provided as a rolled foil. Thereby, such a plastic skin can also be produced with large surfaces and in roll or sheet form which can then be shipped in large quantities for different applications. After cutting to size, such an endless foil can easily be used for the subsequent deep-drawing process in a component mold.

In a further advantageous embodiment, the mixture is pressed onto the rolled foil by means of the usual print processes. This simplifies mass production.

In a further advantageous embodiment, the mixture of the plastic material of the plastic skin and the conducting material contains a solvent which macerates or partially solubilizes the plastic skin present or applied already. Solvents can, as previously stated, substantially ease the bonding of the layers and thus accelerate the production process.

In a further advantageous embodiment, the conducting path is initially produced separately and then joined with the plastic skin. Thereby, a layer of plastic material, a layer of mixture, and then again a layer of plastic material are alternately layered and interconnected into a multi-layered conducting foil. Thereafter, the conducting foil is cut into strip-shaped conducting paths and joined with the plastic skin. Thus, large quantities of conducting paths can be pre-fabricated and implemented according to need. With this embodiment of the method, one can also provide conducting paths for differently produced plastic skins, for example, for molded skins produced according to the rotation sintering process as well as rolled skins.

In a further advantageous embodiment, a plurality of plastic material layers and mixture layers are joined into a multi-layered conducting foil. Thereby, as described above, spatially distributed conducting paths can be produced.

In a further very simple and thus advantageous further embodiment, the connection between conducting path and plastic skin results through adhesive bonding. In addition, adhesive bonding is an especially secure method of joining.

In a further advantageous embodiment, the connection between conducting path and plastic skin results through melting on in heat. This is also convenient in warm-mold processes because sufficient process heat is available anyway. The conducting mixture of the conducting paths, for example, comprising a PVC-mixture, can also be processed in the form of a melt rod, that is, approximately at temperatures of 150° to 200° C. with the aid of a glue gun.

In a further especially simple embodiment, the connection between conducting path and plastic skin is achieved by plasticizing of the connection borders, for example, by adding a solvent.

The plastic skin according to the invention is especially suited as a surface coating for trim components for the interior of a vehicle, that is, for the application for a trim component for the interior of a vehicle, in particular a dashboard. Thus, conducting paths are already arranged in the plastic skin, by means of which the plastic skin can realize an electrically conducting function or also switching, sensor or signal-transmitting functions. Such functional elements in the plastic skin obviate the need for subsequent installation of the same in the form of separate lines, switches, sensors, which in turn would need to be securely connected to the plastic skin and provided with connecting cables.

The embedding of conducting paths is especially useful for switching elements which, for example, are to be operated by the occupants of a vehicle. Sensor elements such as temperature sensors or infrared sensors can be positioned directly on the surface of the plastic skin and can be connected to the corresponding control units or actuators via the conducting paths.

Examples of electronic switching elements which are integrated over the conducting paths include sensors that react to pressure, temperature, et cetera or elements which, for instance, generate signals in the form of light, sounds, waves, vibrations, et cetera. Illuminants, preferably LED illuminants can be integrated with conducting paths so that in regard to a dashboard, the subsequent elaborate installation of a dashboard or glove compartment light is no longer required.

With the increased proliferation of satellite-based navigation devices in vehicles, which project a map of the surroundings, conducting elements embedded in the plastic skin make it possible to connect, for example, signal-transmitting elements in the form of flat screens, preferably as foil-shaped screens which can be used as a display for the navigation device or with a corresponding TV control for television screens.

Elements such as, for example, flat illuminators or flat screens integrated as signal-transmitting elements in plastic foil are suited in the same manner for a dashboard in an automobile as for a furniture coating for furniture in a conference room or hotel lobby because of the simple connection possibilities via the conducting paths embedded in the plastic skin.

The plastic skin according to the invention is likewise especially suited for the use in coating material for vehicle seats. For example, the conducting paths can serve as heat conductors for a seat heater. Such a conducting plastic skin can be used as resistance heating in the form of an electrically conducting planar formation, for example, as a seat heater in which a current which heats the electrically conducting planar formation is applied via electrodes.

Of course, such a plastic skin can also be excellently used as door panels in a motor vehicle in which the switching elements for the window regulator and the side mirrors are connected via conducting paths in the plastic skin or for seat or backrest covers in airplanes in which switching elements for lighting, ventilation, and service calls are integrated, and so forth.

BRIEF DESCRIPTION OF THE DRAWING

The invention will now be described with reference to the single figure of the drawing (FIG. 1) which shows a molded skin 1, namely a so-called slush-skin for a dashboard of an automobile which is produced according to the rotation sintering method.

DESCRIPTION OF THE PREFERRED
EMBODIMENTS OF THE INVENTION

FIG. 1 shows a molded skin 1, namely a so-called slush-skin for a dashboard of an automobile, which is produced according to the rotation sintering method. The contour of the dashboard is already clearly pronounced so that the molded skin can be applied to a correspondingly configured reinforcing substructure, a so-called carrier.

The hatched regions (2, 3) of the molded skin are surplus mold edges which are removed in postprocessing. The hatched region 4 is also cut out in postprocessing and then forms a cavity for the display instruments to be installed later.

Not visible since embedded and melted in the molded skin are conducting paths for the switching, sensing, or signal-transmitting elements 5, 6, 7, and 8, namely for the emitting speakers 5, the switches for balance, volume, et cetera associated therewith and arranged in the switch panel 6, as well as switch elements 7 for the operation of the headlight height setting and the LED-illuminants 8 which later are to serve as reading lighting for the passenger. All these elements contact the conducting paths or are in part comprised of the conducting paths or function with switch parts which are formed or provided by the conducting paths. These switch elements 6 and 7 are so-called foil switches which react to the change in the electric field when touched. All connections to the elements 5, 6, 7, and 8 are—even if not shown in detail—guided as conducting paths already up to the back side of the molded skin and can be connected directly to the electric system of the motor vehicle during installation of the dashboard.

It is understood that the foregoing description is that of the preferred embodiments of the invention and that various changes and modifications may be made thereto without departing from the spirit and scope of the invention as defined in the appended claims.

Reference Character Legend
1) plastic skin
2) superfluous mold edge
3) superfluous mold edge
4) cavity
5) flat speaker
6) switch panel/switch elements
7) switch elements
8) LED (Light Emitting Diode) illuminants

What is claimed is:

1. A plastic skin as a surface cover for a part for the interior of a vehicle, the plastic skin comprising:
   an electric conducting path embedded in said plastic skin;
   said plastic skin being composed of a plastic material; and,
   said electric conducting path being a mixture of said plastic material of said plastic skin and a conducting material wherein:
   said plastic material is polyvinylchloride (PVC);
   said conducting path is a mixture of said polyvinylchloride (PVC) and graphite or a mixture of polyvinylchloride (PVC) and carbon black;
   said plastic skin has a layer thickness: and,
   said conducting path is arranged as an intermediate layer within said layer thickness of said plastic skin.

2. The plastic skin of claim 1, wherein said mixture of said conducting path contains carbon fibers or metal powder as said conducting material.

3. The plastic skin of claim 1, wherein:
   said plastic skin has a back side; and,
   said conducting path is arranged on said back side of said plastic skin.

4. A method of making a plastic skin as a surface cover for a part for the interior of a vehicle wherein the plastic skin includes an electric conducting path embedded therein; the plastic skin is composed of a plastic material; and, the electric conducting path is a mixture of said plastic material of said plastic skin and a conducting material, the method comprising the step of:
   working said conducting material into said plastic material in a rolling-kneading process.

5. A method of making a plastic skin as a surface cover for a part for the interior of a vehicle wherein the plastic skin includes an electric conducting path embedded therein; the plastic skin is composed of a plastic material; and, the electric conducting path is a mixture of said plastic material of said plastic skin and a conducting material, the method comprising the steps of:
   constructing said plastic skin as a mold skin via a repeated melting of plastic materials on a surface area of a heated mold;
   then removing said mold skin from said mold; and,
   wherein said repeated melting includes the steps of:
   first applying at least one layer of said plastic material of said plastic skin onto said mold;
   melting said plastic material on said mold;
   thereafter applying a mixture of said plastic material of said plastic skin and said conducting material; and,
   melting said mixture of said plastic material and said conducting material.

6. The method of claim 5, wherein said repeated melting comprises the steps of:
   first applying a layer of said plastic material in the form of a powder to the mold and melting said plastic material; and,
   then applying the mixture of said plastic material of said plastic skin and said conducting material in the form of a powder mixture and melting said mixture.

7. The method of claim 6, wherein the powder mixture is applied to the surface of the already applied plastic material of said plastic skin with the aid of a spray method or a rotation sinter method.

8. The method of claim 5, wherein repeated melting comprises the steps of:
   first applying a layer of said plastic material of said plastic skin in the form of a powder to the mold and melting the same; and,
   thereafter applying said mixture of said plastic material of said plastic skin and a conducting material in the form of a mixture disposed in a solution and melting the same.

9. A method of making a plastic skin as a surface cover for a part for the interior of a vehicle wherein the plastic skin includes an electric conducting path embedded therein; the plastic skin is composed of a plastic material; and, the electric conducting path is a mixture of said plastic material of said plastic skin and a conducting material, the method comprising the steps of:
   first producing said plastic skin as a rolled foil; and,
   then applying a mixture of said plastic material of said plastic skin and said conducting material and bonding said mixture to said plastic skin in the form of a rolled foil.

10. The method of claim 9, wherein said mixture is pressed onto said rolled foil.

11. The method of claim 9, wherein said mixture contains a solvent which softens or partially dissolves the previous applied layer of plastic skin.

12. A method of making a plastic skin as a surface cover for a part for the interior of a vehicle wherein the plastic skin includes an electric conducting path embedded therein; the plastic skin is composed of a plastic material; and, the electric conducting path is a mixture of said plastic material of said plastic skin and a conducting material, the method comprising the steps of:
   first producing said conducting path by alternately applying a layer of plastic material, then a layer of said mixture and then again a layer of said plastic material and bonding said layer to a multi-layer conductor foil;
   then cutting said conductor foil into strip-shaped conducting paths; and,
   thereafter bonding said conducting paths to said plastic skin.

13. The method of claim 12, wherein a plurality of plastic material layers and said mixture layer are bonded to a multi-layer conductor foil.

14. The method of claim 12, wherein the bonding between said conducting path and said plastic skin takes place via plastification of the bonding boundaries.

15. The plastic skin of claim 1, wherein said plastic skin is a heatable covering material for vehicle seats.

* * * * *

UNITED STATES PATENT AND TRADEMARK OFFICE
CERTIFICATE OF CORRECTION

PATENT NO. : 8,434,807 B2
APPLICATION NO. : 13/064074
DATED : May 7, 2013
INVENTOR(S) : Heribert Decher et al.

Page 1 of 1

It is certified that error appears in the above-identified patent and that said Letters Patent is hereby corrected as shown below:

In the Claims

In Column 7, Claim 1:
Line 25: delete "thickness:" and insert -- thickness; -- therefor.

Signed and Sealed this
Second Day of July, 2013

Teresa Stanek Rea
*Acting Director of the United States Patent and Trademark Office*